March 17, 1931.    G. JOHNSON    1,796,525
FASTENER SOCKET
Filed Feb. 2, 1929
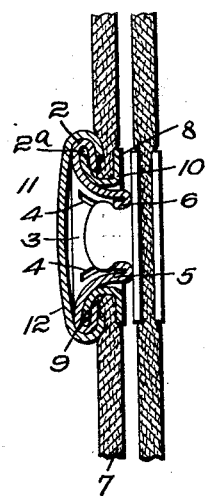
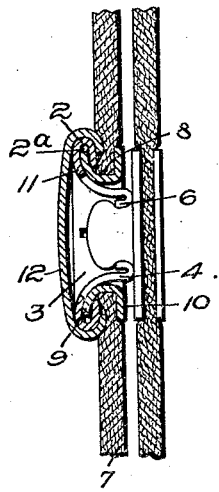
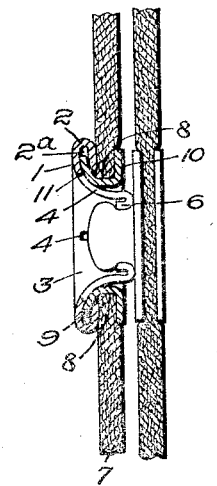
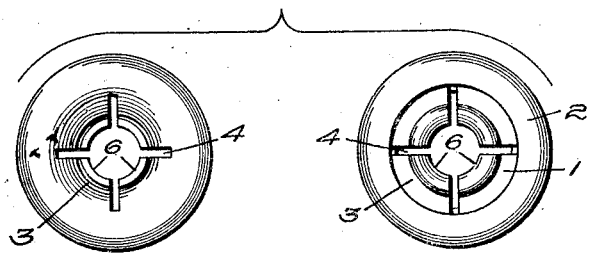
Inventor:
Gustav Johnson
by Emery, Booth, Janney & Varney
Attys Patented Mar. 17, 1931

1,796,525

UNITED STATES PATENT OFFICE

GUSTAV JOHNSON, OF WEST ROXBURY, MASSACHUSETTS, ASSIGNOR TO UNITED-CARR FASTENER CORPORATION, OF CAMBRIDGE, MASSACHUSETTS, A CORPORATION OF MASSACHUSETTS

FASTENER SOCKET

Application filed February 2, 1929. Serial No. 337,033.

My invention aims to provide improvements in fastener sockets for snap fasteners.

In the drawings which illustrate a preferred embodiment of my invention:—

Figure 1 is a vertical section through a snap fastener installation showing the stud in elevation and the socket in cross-section as it appears when the section is taken through the stud-engaging fingers;

Fig. 2 is a section similar to Figure 1, except that the section is taken through the slots between the stud-engaging fingers;

Fig. 3 is a section similar to Fig. 2, but with the cap part omitted; and

Fig. 4 shows views of the ends of the stud-receiving part of the socket.

Referring to the illustrative embodiment of my invention shown by the drawing the stud is of a well known construction and does not form a part of my invention. The simplest form of my improved socket installation is shown in Fig. 3 and, therefore, I shall first describe that installation.

The stud-receiving part 1 is formed from a single piece of sheet metal having a portion 2 at its periphery U-shaped in cross section and formed by doubling over the peripheral portion of the metal and having a space 2ª for purposes hereinafter to be described. The central portion of the part 1 is pressed out to provide a hollow boss 3 open at both ends. This boss 3 is divided throughout its length by slits 4 thereby providing a number of yieldable fingers 5 (Figs. 1 and 4) surrounding a stud-receiving aperture.

In order to adapt the fingers 5 for engagement with the neck of the stud, I have turned the free ends inwardly and back upon themselves to provide jaw portions 6.

To secure the stud-receiving part to a flexible socket-carrying medium or other suitable support 7, I enter the boss 3 through an aperture 8 in the carrying medium 7, so that the U-shaped portion 2 rests against one face of the support. I then present the rivet portion 9 of an attaching element 10 at the opposite side of the support 7 and enter it through the aperture 8. Force is then applied to the metal part of the socket and the rivet engages the curved wall 11 of the boss 3 and is bent outwardly and forced into the space 2ª. In this manner the carrying medium 7 is gripped tightly between the parts 1 and 10 and the socket-engaging part is securely held in position. The rivet portion 9 surrounds the fingers 5 and prevents overexpansion of them.

By making the stud-receiving part 1 in the manner above described I provide a simple, strong and inexpensive socket by using the least possible amount of metal and the number of operations necessary to form it are reduced to a minimum.

Where a neater appearing socket is desired, a cap member 12 (Figs. 1 and 2) may be secured to the socket-receiving part 1 thereby covering the exposed portions.

While I have shown and described a preferred embodiment of my invention, I do not wish to be limited to the exact structure and, therefore, reference is made to the following claims.

Claims:

1. A fastener socket installation comprising, in combination, a stud-receiving part having a centrally depressed portion providing a boss split into a number of resilient fingers surrounding a stud-receiving aperture, a ring-like portion U-shaped in cross-section, said ring-like portion being formed as a part of said stud-receiving part and including the periphery thereof, said boss having a wall flared outwardly from its free end toward said ring-like portion, a socket-carrying support having an aperture therethrough, said stud-receiving part having its boss extending into the aperture in the said support, and an attaching element having a portion resting against one face of the said support and having a tubular rivet portion extending therefrom through the support in substantially spaced relation to the external portion of the free end of the boss of the stud-receiving part, thereby to permit relatively free flexing of the fingers during engagement with and disengagement from a cooperating stud, and said tubular rivet portion being bent outwardly by said flared wall of said boss into the hollow of the U-shaped ring-like portion to hold the parts of the installation in assembled relation.

2. A socket including a stud-receiving part for a socket installation formed from a single piece of metal and having a portion 2 U-shaped in cross-section, a boss 3 open at both ends and divided into a number of fingers 5 and having a curved wall 11 flaring directly into one wall of said portion 2 for deflecting outwardly the portion 9 of an attaching means 8 into a space $2^a$ provided by the portion 2, and a separate cap member 12 having its peripheral portion crimped over the edge of the portion 2 to secure it to the stud-receiving part and close the boss 3 at one end.

In testimony whereof, I have signed my name to this specification.

GUSTAV JOHNSON.